(12) United States Patent
    Adriaens (10) Patent No.: US 10,470,431 B2
(45) Date of Patent: Nov. 12, 2019

(54) DEVICE FOR PROCESSING LIQUIDS THROUGH STEAM

(71) Applicant: SCHUILENBURG NV, Dendermonde (BE)

(72) Inventor: Jan Adriaens, Hamme (BE)

(73) Assignee: Schuilenburg NC, Dendermonde (BE)

( * ) Notice: Subject to any disclaimer, the term of this patent is extended or adjusted under 35 U.S.C. 154(b) by 132 days.

(21) Appl. No.: 15/527,003

(22) PCT Filed: Nov. 17, 2015

(86) PCT No.: PCT/IB2015/058899
§ 371 (c)(1),
(2) Date: May 15, 2017

(87) PCT Pub. No.: WO2016/079680
PCT Pub. Date: May 26, 2016

(65) Prior Publication Data
US 2017/0359996 A1    Dec. 21, 2017

(30) Foreign Application Priority Data

Nov. 19, 2014  (BE) .................................. 2014/5074

(51) Int. Cl.
    *A01J 11/04*     (2006.01)
    *A47J 31/44*     (2006.01)
    *A47J 31/54*     (2006.01)

(52) U.S. Cl.
    CPC ........... *A01J 11/04* (2013.01); *A47J 31/4489* (2013.01); *A47J 31/545* (2013.01)

(58) Field of Classification Search
    CPC ....... A01J 11/04; A47J 31/4487; A47J 31/545
    (Continued)

(56) References Cited

U.S. PATENT DOCUMENTS 4,342,710 A  *  8/1982  Adolfsson ........... B01F 13/0033
                                                    261/121.1
6,293,187 B1     9/2001  Zils
                         (Continued)

FOREIGN PATENT DOCUMENTS

DE    19921483 C1    8/2000
EP     0472272 B1    6/1991
                 (Continued)

OTHER PUBLICATIONS

Mar. 4, 2016, International Search Report of the International Searching Authority from European Patent Office in PCT/IB2015/058899, which is the international application to this U.S. application.
(Continued)

*Primary Examiner* — Patrick F Brinson
(74) *Attorney, Agent, or Firm* — Kolitch Romano LLP (57)    ABSTRACT

Device, comprising a platform for placing a vessel containing the liquid, a pipe with an open end configured for supplying steam to the vessel, a driving device configured to actuate a relative movement between the end of the pipe and the platform, means for determining a liquid level of the liquid in the vessel, and a control unit. The control unit is configured to actuate the driving device so that a relative initial position between the end of the pipe and the platform is assumed on the basis of the liquid level. The means for determining the liquid level comprise a weighing device. The control unit is then configured to determine the liquid level from the weight.

18 Claims, 5 Drawing Sheets

(58) Field of Classification Search
USPC .............................. 99/323.1, 287, 293, 453
See application file for complete search history.

(56) References Cited

U.S. PATENT DOCUMENTS

| | | | | |
|---|---|---|---|---|
| 6,582,743 | B2* | 6/2003 | Cai | A47J 27/04 426/510 |
| 8,047,125 | B2 | 11/2011 | Bazin et al. | |
| 8,403,306 | B2 | 3/2013 | Stahl et al. | |
| 2014/0123858 | A1* | 5/2014 | Rellis | A47J 31/46 99/293 |
| 2014/0264972 | A1* | 9/2014 | Studor | B01F 3/04446 261/121.1 |
| 2015/0104548 | A1 | 4/2015 | Yip | |

FOREIGN PATENT DOCUMENTS

| | | |
|---|---|---|
| EP | 0630603 A1 | 12/1994 |
| EP | 0289048 B1 | 1/1995 |
| EP | 1955623 A1 | 8/2008 |
| EP | 2229850 A1 | 9/2010 |
| EP | 2389848 A1 | 11/2011 |
| EP | 2409611 A1 | 1/2012 |
| EP | 1889961 B1 | 5/2013 |
| EP | 2633788 A1 | 9/2013 |
| EP | 3073051 A1 | 9/2016 |
| FR | 2879426 A1 | 6/2006 |
| GB | 2476066 A | 6/2011 |
| KR | 2003-0033740 A | 5/2003 |
| WO | 2014165911 A2 | 10/2014 |

OTHER PUBLICATIONS

Mar. 4, 2016, Written Opinion of the International Searching Authority from European Patent Office in PCT/IB2015/058899, which is the international application to this U.S. application.

* cited by examiner

DEVICE FOR PROCESSING LIQUIDS THROUGH STEAM

CROSS-REFERENCE TO RELATED APPLICATIONS

This application is a national phase application of PCT/IB2015/058899, filed Nov. 17, 2015, which claims priority to Belgium Patent Application No. 2014/5074, filed Nov. 19, 2014, each of which is hereby incorporated by reference.

BACKGROUND OF THE INVENTION

The present invention relates to a device for the controlled treatment of food liquids by means of steam. In particular, the invention relates to the heating and/or frothing up of food liquids, in particular milk, milk-containing drinks and similar liquids, such as soya milk, by means of steam.

Milk is usually foamed by means of steam or via mechanical means, such as e.g. coiled stirrers. In the hotel, restaurant and catering trade, steam is the method used most often. A steam generator produces steam, which is blown into a jug filled with milk via a steam pipe. Producing foamed milk of the correct texture, temperature and consistency requires extensive experience and expertise of the barista.

Devices are known attempting to partly emulate the knowledge and expertise of the barista. It is known from e.g. EP 2633788, to incorporate a temperature probe in the steam pipe. A control unit, connected to the temperature probe, controls the supply of steam on the basis of the desired type of foam and stops the supply when the desired final temperature is reached. Since the temperature probe protrudes from the steam pipe, such a device is more difficult to clean.

EP 2229850 describes a device in which the steam pipe is arranged so as to be moveable. The device may be provided with a programme containing a movement path for the steam pipe which depends of the desired milk foam. A temperature sensor may be provided in order to select an optimum movement programme for the steam pipe on the basis of the temperature of the milk to be foamed. EP 2229850 provides a float on the steam pipe in order to ensure a constant distance between the end of the steam pipe and the liquid level. Such a float not only results in a complicated construction, because the steam pipe has to be arranged in a sprung manner. The float also forms an obstacle when cleaning the appliance. On the other hand, EP 2229850 provides an active movement element for actuating a movement of the steam pipe which element is connected to a sensor for detecting the liquid level, in which the movement of the steam pipe is actuated depending on the measured values of this sensor.

In order to obtain milk foam of good quality using the abovementioned devices, it is important to correctly determine the liquid level. However, air bubbles or other contaminants are often present on the liquid surface of milk and prevent accurate measurement, as a result of which an appliance cannot function properly and cannot deliver foam of consistent quality.

BRIEF SUMMARY OF THE INVENTION

It is an aim of the present invention to provide a device allowing improved treatment of the liquids. An aim of the invention is e.g. to produce better milk foam, irrespective of who is operating the device. Better milk foam could mean foam with smaller air bubbles, such as microbubbles.

It is an aim of the invention to provide an abovementioned device which is able to correctly determine the liquid level of the food liquid to be treated.

According to the invention, a device and an assembly for treating food liquids, including milk, is therefore provided, as set out in the attached claims. Devices according to the invention comprise a platform for placing a vessel containing the liquid, a pipe with an open end configured for supplying steam to the vessel, a driving device configured to actuate a relative movement between the end of the pipe and the platform, means for determining a liquid level of the liquid in the vessel when the vessel is arranged on the platform, and a control unit connected to the means for determining the liquid level and to the driving device. The control unit is configured to actuate the driving device so that a relative initial position between the end of the pipe and the platform is assumed, on the basis of the liquid level. The assembly is formed by the combination of the abovementioned device and the vessel.

According to a first aspect of the invention, the means for determining the liquid level comprise means for determining the weight of a liquid in the vessel, such as a weighing device. The control unit is then configured to determine the liquid level from the weight. Such a calculation ensures that the level is determined regardless of the state of the liquid surface and is consequently always reliable, unlike e.g. optical measuring methods.

According to a second aspect of the invention, which may be provided either separately or in combination with the first aspect, the control unit is configured to actuate the driving device to perform a movement path for the relative movement between the end of the pipe and the platform during the supply of steam. Advantageously, the movement path starts from the initial position and advantageously comprises an upward movement, which may start from the initial position and which is advantageously performed at a predetermined (i.e. determined in the control unit) speed. Carrying out this upward movement at a controlled speed is effective, since this may result in better foaming.

The control unit advantageously comprises readable memory and/or executable programme code. The readable memory advantageously comprises data which are indicative for a size or geometry of the vessel. Advantageously, these data make it possible to determine the liquid level by measuring the weight. The data can be stored in the readable memory in the form of a look-up table.

The executable programme code is advantageously configured to determine the initial position on the basis of the liquid level which is determined by the means for determining the liquid level. Advantageously, a first parameter is stored in the readable memory, which parameter corresponds to a predetermined distance. The programme code is advantageously configured to determine the initial position as a position corresponding to the predetermined distance below the liquid level. Advantageously, a second parameter is stored in the memory, corresponding to a predetermined distance to be travelled. The executable programme code is advantageously configured to determine the upward movement as a path travelled corresponding to the second parameter. Advantageously, a third parameter corresponding to a predetermined speed or a predetermined time span for travelling a distance is stored in the memory. The executable programme code is advantageously configured to execute the upward movement according to the third parameter.

According to a further aspect of the invention, a method is provided for treating food liquids by means of steam, in particular for the foaming of milk, as set out in the attached claims.

Likewise described are a device and an assembly for treating food liquids, including milk, according to an additional aspect, which may be provided separately or in combination with the abovementioned aspects. The device comprises a platform, for placing a vessel containing the food liquid thereon in a removable manner, and a pipe having an open end configured for the supply of steam to the vessel, when the vessel is placed on the platform. The assembly consists of the combination of the abovementioned device and the vessel. The device additionally comprises a valve system comprising (at least) a valve, (at least) two separately closable fluid outlets and a fluid inlet. The device furthermore comprises a control unit provided to control the valve system. The valve system is advantageously configured (e.g. by control of the control unit) to assume a first switch position, in which an exclusive connection is made between the fluid inlet and a first one of the two fluid outlets (in which a second of the two fluid outlets is closed off), and to assume a second switch position, in which an exclusive connection is made between the fluid inlet and the second one of the two fluid outlets (in which the first fluid outlet is closed off). Advantageously, the device comprises a liquid discharge and the first of the two fluid outlets is connected to the liquid discharge. Advantageously, the second one of the two fluid outlets is coupled to the pipe and the fluid inlet is configured to be coupled to a steam generator, which may be incorporated in the device or may be arranged separate from the device.

The valve system is advantageously used to flush condensation water out of the steam conduits, advantageously prior to a treatment operation on the food liquid in the vessel. This results in a better treatment of the food liquid in the vessel. To this end, the control unit is advantageously configured to take the valve system to the first switch position prior to taking the valve system to the second switch position.

Advantageously, the device furthermore comprises a driving device configured to actuate a relative movement between the end of the pipe and the platform, with the control unit being connected to the driving device. The control unit is configured to actuate the driving device in such a way that an initial relative position between the end of the pipe and the platform is adjusted. The initial relative position advantageously refers to a relative position between the end of the pipe and the platform before the valve system is taken to the first switch position. Advantageously, the control unit is configured to simultaneously actuate the valve system and the driving device, so that the valve system is taken to the first switch position while the initial relative position is being adjusted. In this way, the device is able to carry out a treatment operation more quickly.

Embodiments with additional advantages are described in the dependent claims.

BRIEF DESCRIPTION OF THE DRAWINGS

Aspects of the invention will be explained below with reference to the following figures.

DETAILED DESCRIPTION OF THE INVENTION

In the present description, reference is made to milk as a food liquid. It should be noted that devices according to the invention are not limited in their use to only milk, but that other food liquids, in particular drinks, may also be treated. These food liquids are preferably liquids, emulsions or suspensions comprising milk, such as drinking chocolate, but this is by no means limiting. Soya milk or other drinks can also be treated using devices according to the invention.

Figure 1:
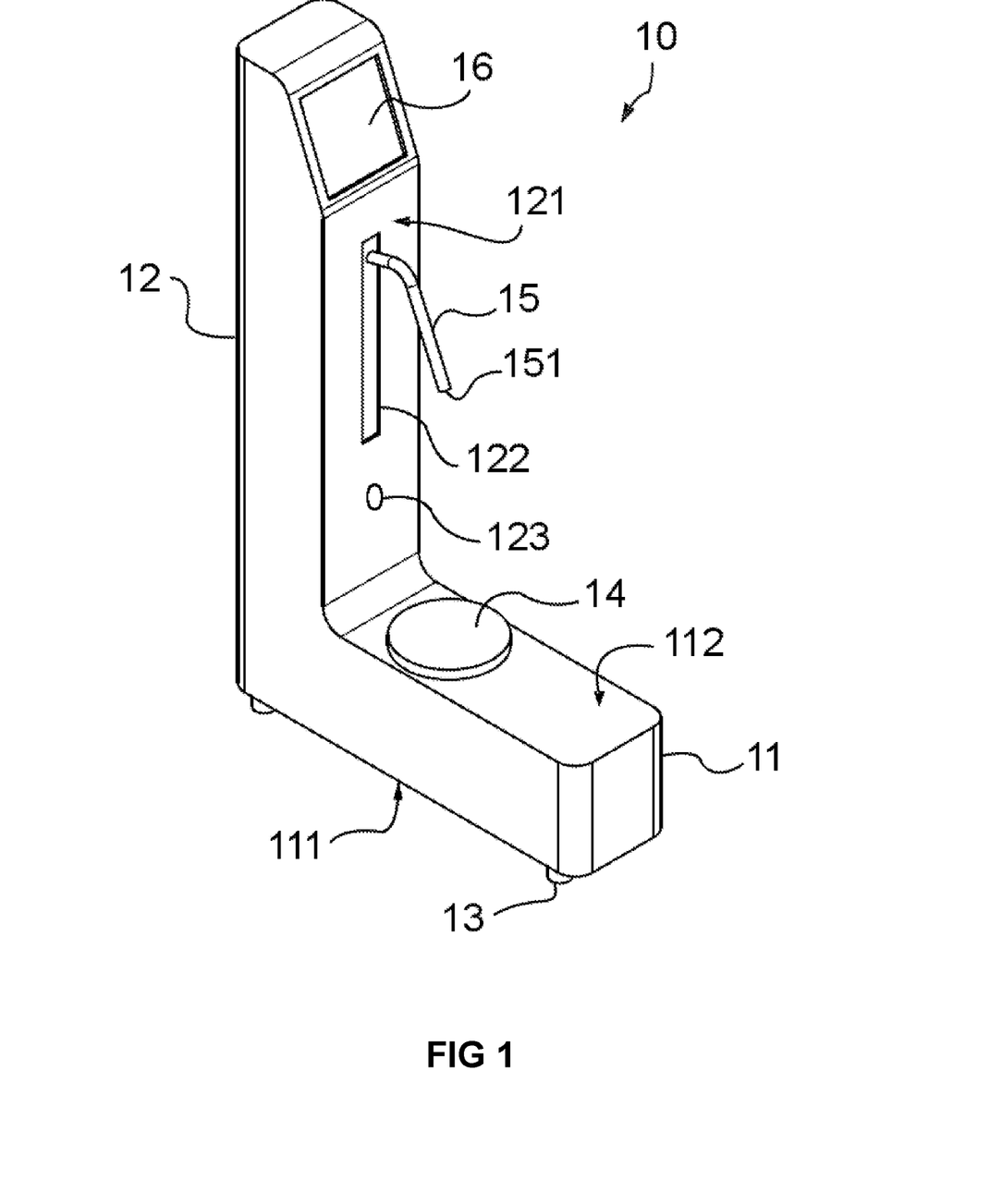
FIG. 1 shows a perspective view of a device for treating liquids according to the invention.

With reference to FIG. 1, the device 10 comprises a housing formed by a base part 11 and a tower part 12. The device 10 rests on a surface by means of the base part 11. To this end, base part 11 has an underside 111 which is provided with supporting feet 13. The tower part 12 is arranged at one end of the base part 11 and preferably projects vertically from the base part 11. A front side 121 of the tower part is turned towards the base part 11.

The base part has a top side 112, on which a platform 14 is provided. Platform 14 forms a support on which a receptacle 9 (see FIG. 2) containing the liquid to be treated (milk) is placed.

In the housing of the tower part 12, a preferably vertically extending recess 122 is arranged at its front side 121. A steam pipe 15, better known as a 'steam lance', protrudes from the recess 122. A hole 123 is also provided in the housing, preferably below the recess 122. A temperature sensor 19 (FIG. 2) is provided in the hole 123.

The device 10 furthermore preferably comprises a user interface 16 which makes it possible to operate the device. User interface 16 may comprise, e.g. a screen, such as a touch screen, or a number of operating buttons, or a combination of both. Alternatively, the user interface 16 may be provided on an (external) apparatus separate from the device 10, such as a smart phone provided with a suitable application. In such a case, the external apparatus and the device 10 will be configured to communicate with one another.

Figure 2:
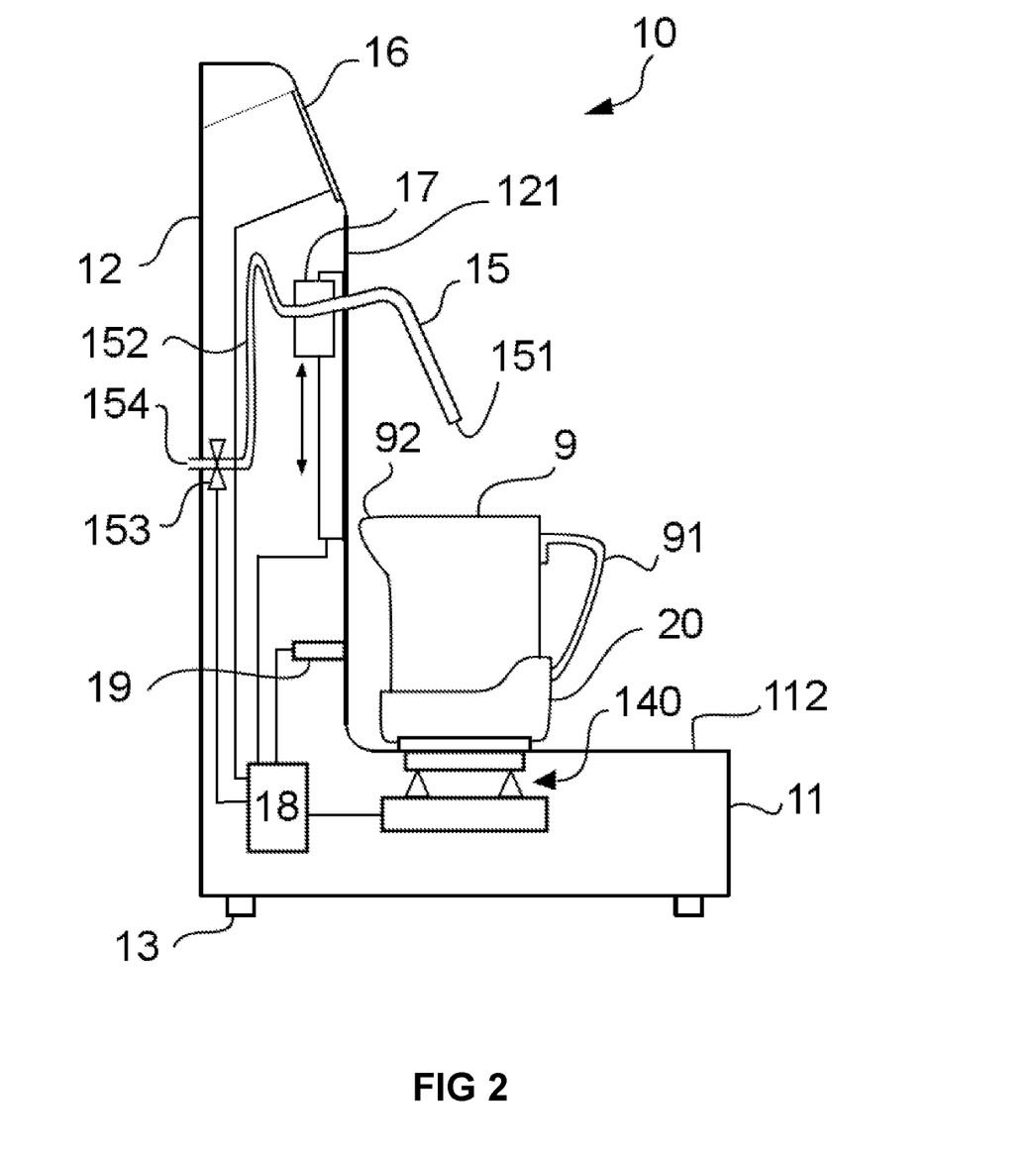
FIG. 2 shows a lateral cross section of the device, in which the internal parts are shown diagrammatically.

Referring to FIG. 2, the device 10 comprises a driving device 17, such as e.g. a linear slide, which is arranged in the housing at the location of the recess 122. The steam pipe 15 is attached to the driving device 17. The driving device 17 enables a movement of the steam pipe along the recess 122. As is illustrated in the figures, this movement is preferably, but not necessarily, a linear, preferably vertical, movement.

Driving device 17 ensures that the steam pipe 15 can preferably move up and down with respect to the platform 14. If a milk jug 9 is placed on the platform 14, the driving device makes it possible to move the end 151 (the pipe nozzle) of the steam pipe 15 into the milk jug 9.

A control unit 18, which is connected to driving device 17, takes care of the control thereof, as will be described below.

The steam pipe 15 is internally (inside the housing) connected to a steam conduit 152 which is able to follow the upward and downward movement of the pipe 15. A valve 153 is preferably provided in the steam conduit in order to start and stop the supply of steam. If desired, valve 153 may regulate the flow of the steam. Steam conduit 152 is provided with a connecting port 154 for connecting to a steam generator. The steam generator, which is not shown in the figures, may be an external generator and consequently not be part of device 10. Alternatively, the steam generator may be incorporated in the device 10.

The valve 153 is preferably connected to the control unit 18, so that it can be actuated by the control unit.

According to the invention, liquids present in the jug 9 are treated by blowing steam through the liquid via steam pipe 15. Under certain circumstances, blowing steam through the liquid may result in air being added to the liquid. For example in the case of milk, the steam which is blown into the milk will, under suitable circumstances, generate a foam on the liquid surface. The steam may cause the liquid to be heated up, optionally in combination with foaming.

According to aspects of the invention, the initial position of the pipe nozzle 151 in the liquid has to be determined accurately in order to ensure good foaming (or the absence thereof). The inventors noticed that an optical measurement of the liquid level in the milk jug 9 does not yield reliable results. The milk surface often contains air bubbles or may be contaminated, frequently resulting in incorrect measurements.

According to aspects of the invention, the liquid level in the milk jug 9 is determined by measuring the mass (weight) of the liquid in the milk jug 9. On the basis of the specific weight of the liquid, the geometry of the milk jug 9, and optionally the temperature of the liquid, the liquid level can easily be determined based on the mass. Such a calculation results in a determination of the level which is independent from the state of the liquid surface and is consequently always reliable.

To this end, the device comprises means for determining the liquid mass. These means, which are preferably formed by a weighing device 140, are preferably coupled to the platform 14, and configured to determine the mass, which rests on platform 14. Weighing device 140 is also connected to the control unit 18. Determining the liquid level from the weight is carried out by control unit 18. To this end, the control unit 18 advantageously comprises a readable memory, containing e.g. a list with corresponding values between liquid weight and liquid level. Alternatively, the control unit 18 may be provided with parameters in order to determine the liquid level from the weight on the basis of the specific weight of the liquid, the geometry of the milk jug 9 (e.g. a diameter), and optionally the temperature of the liquid.

Advantageously, the milk jug 9 is supplied with the device 10, so that the calibration of the weighing device 140 can be carried out in the factory.

The temperature sensor 19 is preferably arranged in the hole 123, so that it faces the milk jug 9. The temperature sensor is preferably an infra-red sensor, and is configured to measure the temperature of the wall of the milk jug 9. A suitable sensor is a sensor from the PyroCouple™ series, available from Calex Electronics Limited, United Kingdom. If the milk jug 9 is made from a highly thermally conductive material, such as a metal, preferably stainless steel, then the temperature of the wall, which is preferably a single wall, forms a good approximation of the temperature of the liquid (milk) in the jug 9.

Figure 3:
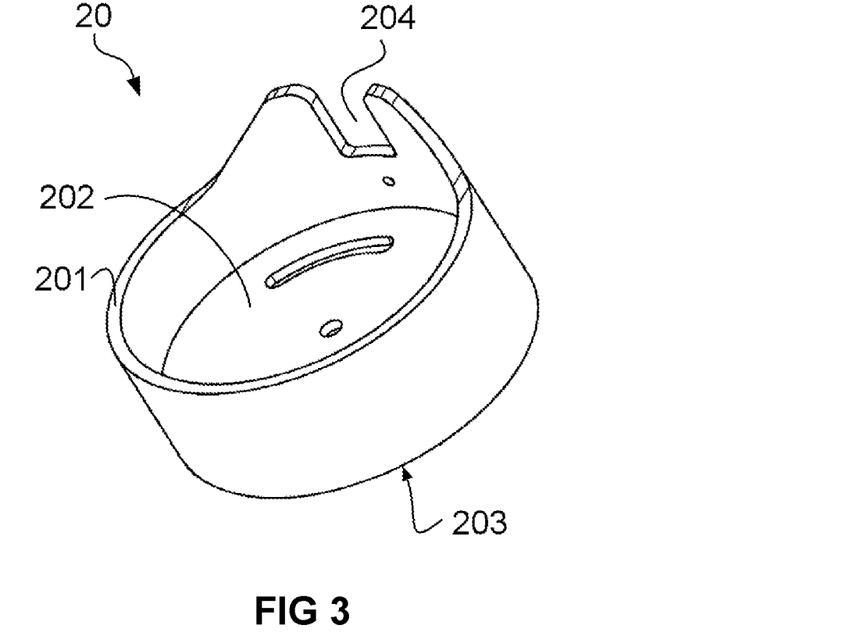
FIG. 3 shows a perspective view of a milk jug holder which is configured to be arranged on the platform of the device.
Figure 4:
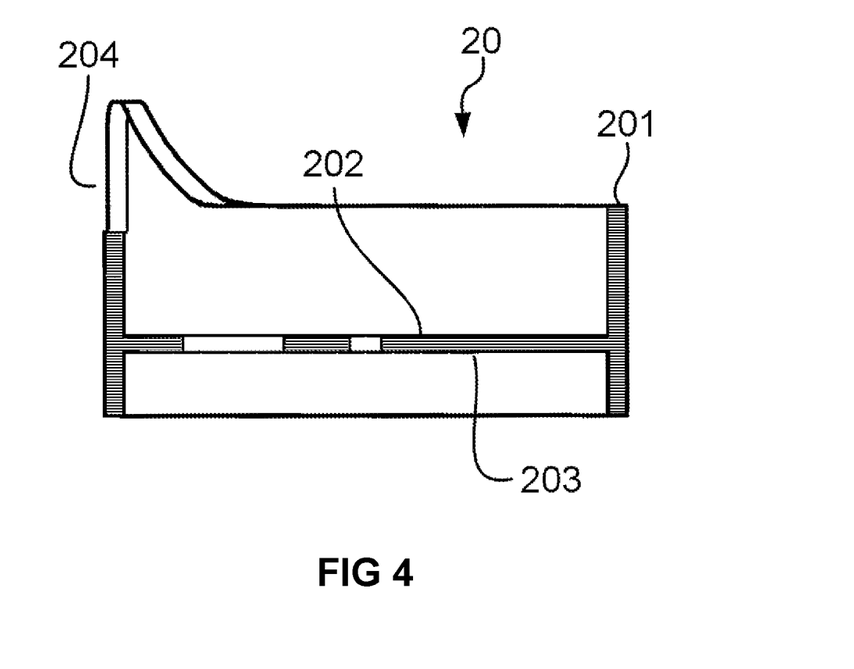
FIG. 4 shows a cross section of the holder shown in FIG. 3.

Advantageously, it is ensured that the milk jug 9 on the platform 14 always assumes the same orientation with respect to the device 10. This can be achieved by means of the holder 20. Referring to FIG. 3 and FIG. 4, the holder 20 comprises an upright wall 201 and a bottom 202. The wall 201 and bottom 202 delimit an internal space which is configured to accommodate the jug 9, so that the jug can be placed in the holder 20. Holder 20 is advantageously configured to be arranged on the platform 14 in a removable manner. This facilitates cleaning.

The underside 203 of the holder 20 on one side and the device 10, preferably the platform 14, on the other side are advantageously provided with corresponding means to place the holder on the platform 14 at a well-defined orientation. These means may, for example, be formed by a tooth and groove or a click-fit connection. These means are able to ensure that the jug 9 is placed in a correct position and/or orientation with respect to the device.

The term orientation refers to an angular orientation about a vertical axis.

Additionally or alternatively, holder 20 is advantageously provided with means to arrange the milk jug 9 at a well-defined orientation with respect to the holder. For example, the holder 20 may have a recess 204 in the wall 201 which is configured to cooperate with the milk jug 9, in particular the handle 91, so that the milk jug 9 only fits into the holder 20 when the handle 91 is introduced into recess 204. Other ways, for example by using jugs 9 having a specific design, so that the holder and the jug comprise corresponding cooperating means are also possible.

Positioning the milk jug 9 at a well-defined orientation offers the advantage that the temperature sensor 19 will always measure the jug 9 at the same location on the wall of the jug 9, thus producing repeatable results. Advantageously, the milk jug is provided with a surface finish desired for measurement, at least at the location of temperature measurement, such as e.g. a matt surface, which may be obtained by sand-blasting. Advantageously, the surface of the milk jug 9 is not reflective.

The milk jug 9 preferably comprises a pouring spout 92. When determining the orientation of the milk jug 9 with respect to the device, the pouring spout 92 is advantageously arranged in such a manner that it is turned towards the steam pipe 15. Such an arrangement allows the steam pipe 15 to be inserted deeper into the jug 9.

The holder 20 may be configured to receive jugs 9 of different sizes and/or shapes. In this case, detection of the type may be effected manually, through input via the user interface 16, or automatically, via suitable sensors, such as e.g. an RFID tag or RFID chip incorporated in the jug 9, which can be read by a receiver connected to the control unit 18, or even via the weighing device 140 by determining the empty weight.

Advantageously, the control unit 18 is provided with a programme code for performing one or more treatment programmes for treating the liquids, e.g. for obtaining different grades of milk foam, or for treating different types of liquids. Advantageously, these programmes can be selected via the user interface 16.

For at least one of these programmes, the control unit 18 advantageously comprises a minimum and/or a maximum threshold value for the liquid level in the jug 9 as a prerequisite for starting the programme. If the liquid level determined by the weighing device 140 is lower than the minimum and/or higher than the maximum, the control unit 18 will not start the desired programme. This ensures that the correct liquid mass is used for the selected programme.

For at least one of these programmes, the control unit 18 advantageously comprises a minimum and/or maximum threshold value for the temperature of the liquid as a prerequisite for starting the programme (starting temperature). If the temperature of the milk is, for example, too hot, it is not possible to obtain good foam and the control unit 18 will not start the desired programme. It is possible to carry out a check for the sake of food safety by providing a maximum threshold value for the starting temperature. According to food safety guidelines, dairy products have to be kept refrigerated and selecting a maximum threshold value for the starting temperature may ensure that the appliance does not start if the milk is too warm.

For at least one of these programmes, the control unit 18 advantageously comprises a final temperature of the liquid which is to be reached. Once this final temperature is reached, the programme will be stopped. The final temperature should not be excessively high in order to prevent the risk of the user burning himself. A suitable final temperature may be between 35° C. and 45° C. 38° C. is a suitable final temperature.

The driving device 17 and/or the control unit 18 may advantageously be configured to perform the relative movement between steam pipe 15 and jug 9 at a well-defined speed.

A treatment programme for the liquid may comprise a pre-programmed movement path for the steam pipe 15. This movement path is advantageously parameterised on the basis of the liquid level, and optionally also on the basis of the (starting) temperature of the liquid in the jug 9. Advantageously, the movement path starts from an initial position. This initial position depends on the liquid level and may be parameterised as a predetermined distance below the liquid level, as determined after weighing the jug 9 by weighing device 140. The initial position may relate to the position of the pipe end 151. The predetermined distance may be stored, e.g. in the readable memory of the control unit. Thus, it is ensured that the starting position for the movement path is always coherent with the amount of liquid in the small jug 9, thus making it possible to obtain more consistent results.

The movement path advantageously comprises an upward path (upward movement) of the steam pipe 15 with respect to the platform 14, during the supply of steam. This upward movement is advantageously carried out at a predetermined speed. The upward movement is carried out while the valve 153 is open. Advantageously, the control unit is configured to start the upward path from the initial position, as described above. Advantageously, the upward path is defined in the control unit by a distance to be travelled, e.g. a distance starting from the initial position. Advantageously, this distance to be travelled is smaller than the difference in height between the liquid level and the initial position of the pipe end 151. The control unit may be configured to control the driving device 17 in such a way that the distance to be travelled is covered in a predetermined time span, as a result of which a speed of movement is set. An upward movement is useful for frothing up, because the supply of steam will suck air into the milk as a result of the Venturi effect. As a result of the upward movement, the Venturi effect will continue when the liquid level is increased due to foaming. It is also useful to perform this upward movement at a controlled speed, because this may lead to better foaming. The upward speed is advantageously determined empirically on the basis of the applied steam flow, temperature and pressure, the desired end product (e.g. type of foam) and the dimensions of the milk jug. The upward speed is advantageously selected in such a way that the pipe end 151 follows the amount of foam formed (level increase).

Advantageously, the speed of the relative movement between steam pipe 15 and the platform 14 is between 2 mm/s and 15 mm/s. This speed is advantageously 12 mm/s or lower, advantageously 10 mm/s or lower, advantageously 8 mm/s or lower, advantageously 6 mm/s or lower.

The movement path may additionally, or alternatively, comprise a stationary position of the steam pipe 15 (stationary with respect to the platform 14), while the pipe nozzle 151 is submerged in the liquid and steam is supplied. The time span during which the steam pipe 15 is to remain stationary may be input in the control unit 18 as a parameter. The movement path may additionally, or alternatively, comprise a downward movement of the steam pipe 15 with respect to the platform 14 during the supply of steam. This downward movement is advantageously carried out at a predetermined speed.

Upward and downward movement paths and standstill of the steam pipe can be combined with each other to achieve an optimum treatment of the liquid. To this end, a movement path may comprise several sub-paths, in which case each sub-path may be an upward movement, downward movement or a standstill. The movements within each sub-path may be carried out at a constant speed. The transition between two sub-paths may be determined on the basis of the liquid temperature. All these data can be stored in the programmes of the control unit 18 as parameters.

Figure 5:
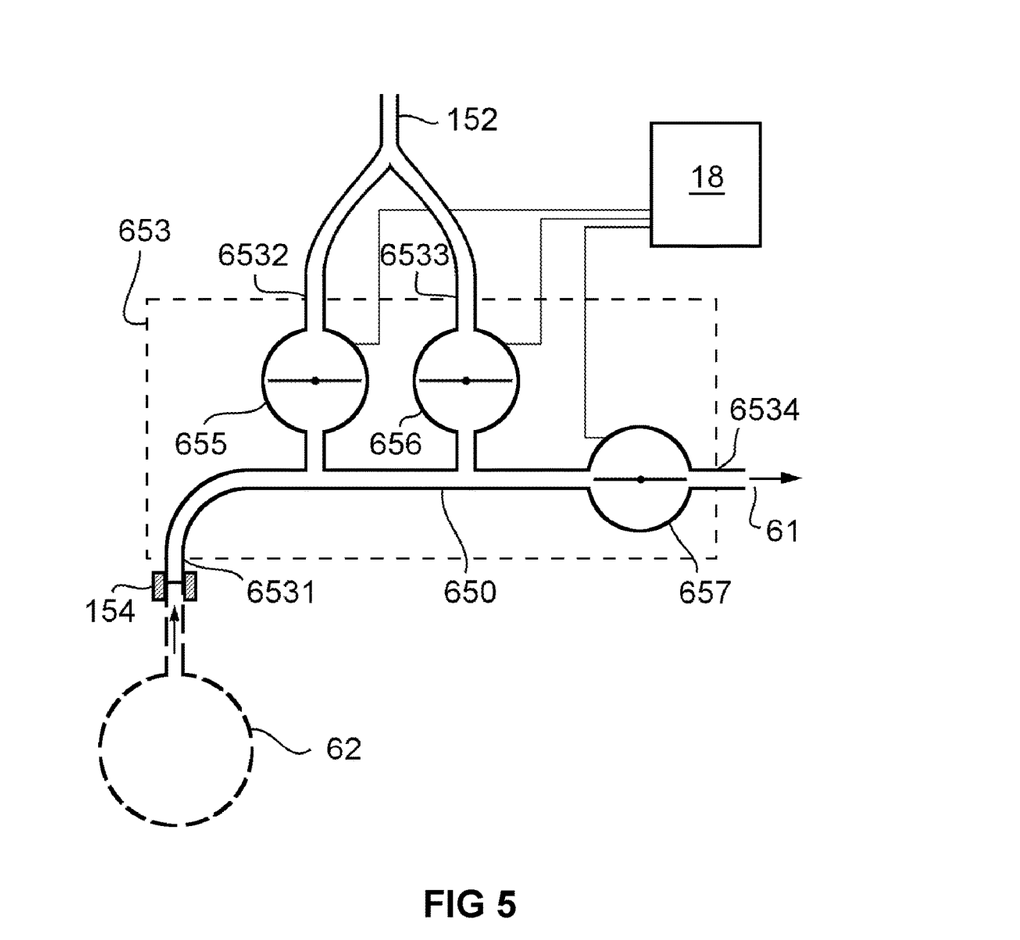
FIG. 5 shows a diagram of a preferred embodiment of a valve system for controlling the supply of steam to the steam pipe.

Referring to FIG. 5, the steam valve 153 may be replaced by a more extensive valve system 653, which makes it possible to flush condensation water out of the steam conduit and/or to adjust the steam flow to steam pipe 15. Valve system 653 comprises a steam inlet 6531 which may be connected to connecting port 154 and furthermore with an external or incorporated steam generator 62. Furthermore, the valve system 653 comprises a number of outlets. At least one outlet, but advantageously several outlets 6532 and 6533, are connected to the steam conduit 152 leading to the steam pipe 15. An additional outlet 6534 is advantageously connected to a discharge 61 of the device 10. Each of the outlets 6532, 6533, 6534 is connected to the inlet 6531 in a closeable manner. To this end, the valve system 653 comprises one or advantageously several valves which can close off the passage between inlet 6531 and each of the outlets. There are several possible embodiments of valves that may be used, such as for example multi-way valves. In the example of FIG. 5, a separate (one-way) valve 655, 656, 657, is used to close off each outlet 6532, 6533, 6534, respectively. Each of these valves is connected to the inlet 6531 via a common steam conduit 650.

Each of these valves is advantageously operationally connected to control unit 18, which provides the individual control for the valves 655, 656, 657. The control unit 18 may provide different switch positions for the valves. In a first switch position, valves 655 and 656 are kept closed and valve 657 is opened (as can be seen in FIG. 5), in which case steam is passed to the discharge 61. In this case, the condensation water is flushed along and this condensation water is prevented from ending up, via steam pipe 15, in the liquid to be treated. In a second switch position, valve 657 is closed and valve 655 is opened while valve 656 remains closed. In this case, steam is passed to steam pipe 15 via steam conduit 152. Valve 656 advantageously makes a third switch position possible, in which valve 656 is opened simultaneously with valve 655, as a result of which, via a common connection of both outlets 6532 and 6533 to steam conduit 152, a greater flow of steam is passed to steam pipe 15. The shown arrangement consequently makes it possible to work with two different steam flows. By extension, it is even possible to provide several steam flows. This is useful if e.g. jugs 9 of different sizes are used. Obviously, the valve system 653 makes a fourth switch position possible, in which all valves are closed.

Advantageously, the control unit 18 is configured to actuate the valve system 653 in such a way that, through suitable selection of the switch positions, a rinse is performed (first switch position) before a new treatment operation is started on a liquid in the jug 9 (second or third switch position). In order not to waste any time, the rinse may take place while actuating the driving device 17 to return the end 151 of steam pipe 15 to the initial position.

Figure 6:
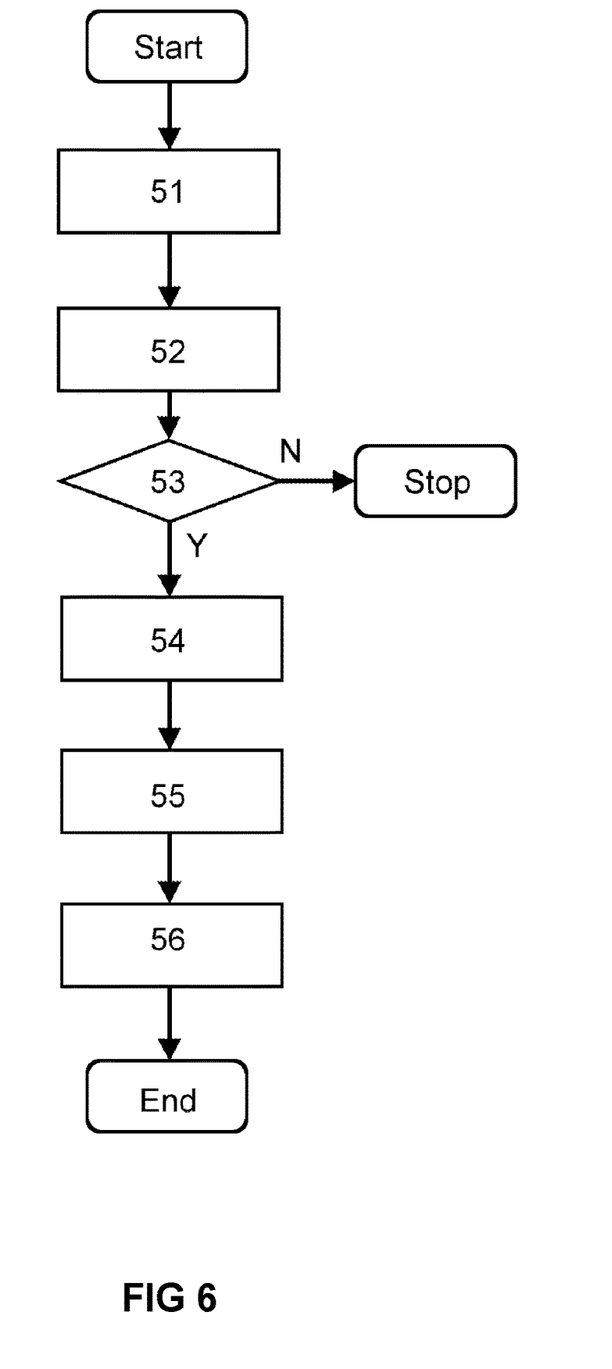
FIG. 6 shows a flow diagram of a method for treating a food liquid by means of the device shown in FIG. 1.

A method for treating—in particular frothing up—a food liquid—in particular milk, may comprise the steps illustrated in FIG. 6. The method is advantageously performed using the above-described devices 10. Beforehand, a user of the device 10 pours the liquid into a jug 9 and correctly places this jug on the platform 14, as explained above. In a first step 51, the jug containing the liquid is weighed on platform 14, in particular by means of weighing device 140. Subsequently, in step 52, the liquid level in the jug 9 is determined on the basis of the weight, in particular in a manner as explained above. The liquid level is advantageously determined taking into account the type of liquid and/or a size of the jug. The determination of the liquid level may comprise an identification of the jug, e.g. in order for the control unit 18 to retrieve the correct data in relation to the jug 9 (e.g. selection of the correct look-up table). The liquid level defines a reference plane, on the basis of which the initial position of the end 151 of steam pipe 15 is determined, which position is preferably situated below the liquid level. In step 53, whether or not the determined liquid level (or the reference plane) exceeds a predetermined (minimum and/or maximum) threshold value is checked. If, for example, too little liquid has been poured into the jug, the control unit may be configured to indicate this via e.g. user interface 16, and no treatment programme will be started. Advantageously, the temperature of the liquid in the jug 9 is measured. In such a case, it is advantageously possible to verify whether the temperature does not exceed a predetermined threshold value. Following positive verification, the method continues with step 54, in which the control unit sends instructions to drive the driving device to move steam pipe 15. In this case, the end 151 of the steam pipe 15 is positioned on the reference plane. This is the initial position for performing a treatment programme. Simultaneously with this positioning, or possibly before or after, the steam conduit is advantageously rinsed in order to discharge any condensation water which may have formed, e.g. by moving valve system 653 into the first switch position. In step 55, the steam supply through steam pipe 15 is opened, e.g. by moving valve system 653 into the second or third switch position. Finally, in step 56, a movement path is carried out, as explained above. Steps 55 and 56 may take place simultaneously.

An example of a recipe to froth milk up may be as follows. A milk jug 9 filled with an arbitrary amount of milk is placed in the holder 20 on the platform 14. On the touch screen 16, the operator selects the programme corresponding to the desired milk foam. By means of the weight, a reference plane is calculated, corresponding to the determined liquid level of the milk in jug 9. The control unit checks if sufficient milk is present (lower and upper limit for liquid level) and if the temperature is sufficiently low (via sensor 19). If these criteria are met, a treatment cycle starts according to the selected programme. The control unit 18 actuates the driving device 17 to move the steam pipe 15 to a depth determined by parameters, below the reference plane, e.g. 5 to 20 mm below the liquid level. Once the steam pipe 15 is in the desired position, the control unit actuates the valve 153 to an open position. Steaming starts. At the same time, control unit 18 actuates the driving device 17 to perform an upward movement of steam pipe 15. This upward movement may be determined by a predetermined speed, e.g. by causing a linear slide to travel a certain upward distance (e.g. 10.5 mm) in a certain time (e.g. 3.5 s). After travelling this distance, the control unit keeps the driving device 17 in a stationary position, as a result of which the steam pipe will stand still. During this stationary standstill, the valve 153 may remain open, so that steaming continues until a predetermined final temperature (=process parameter of the programme) is reached. The control unit 18 then closes the valve 153 and actuates the driving device 17 to a starting position (limit position above), so that the steam pipe 15 is completely removed from the milk jug. The touch screen shows that the programme is completed and the operator can remove the jug with finished product.

The abovementioned example shows that the steam pipe is being actuated, while the platform is stationary. Obviously, it is also possible for the steam pipe to remain stationary and for the platform to move, or even a combination of both.

The temperature sensor 19 can be replaced by a temperature probe which is incorporated in the steam pipe 15.

Device (10), comprising a platform (14) for placing a vessel (9) containing the liquid, a pipe (15) with an open end (151) configured for supplying steam to the vessel, a driving device (17) configured to actuate a relative movement between the end of the pipe and the platform, means (140) for determining a liquid level of the liquid in the vessel, and a control unit (18). The control unit is configured to actuate the driving device (17) so that a relative initial position between the end of the pipe and the platform is assumed on the basis of the liquid level. The means (140) for determining the liquid level comprise a weighing device. The control unit is then configured to determine the liquid level from the weight.

The present disclosure may include one or more of the following concepts:

A. Device (10) for treating food liquids by means of steam, comprising:

a platform (14) for placing a vessel (9) containing the liquid, a pipe (15) with an open end (151), configured to supply steam to the vessel (9), a driving device (17) configured to drive a relative movement between the end (151) of the pipe and the platform (14), means (140) for determining a liquid level of the liquid in the vessel (9) when the vessel is arranged on the platform (14), and a control unit (18) operationally connected to the means (140) for determining the liquid level and to the driving device (17), wherein the control unit (18) is configured to actuate the driving device (17) such that a relative initial position between the end (151) of the pipe and the platform (14) is assumed which is based on the liquid level, characterised in that the means (140) for determining the liquid level comprise means for determining the weight of a liquid in the vessel, wherein the control unit is configured to determine the liquid level from the weight.

B. Device (10) in accordance with paragraph A, wherein the control unit (18) comprises a readable memory, wherein the memory comprises a list with corresponding values between liquid weight and liquid level.

C. Device (10) in accordance with paragraphs A or B, comprising a supply valve (153) for the steam connected to the pipe (15), wherein the supply valve is connected to the control unit (18) in an actuatable way.

D. Device (10) in accordance with paragraph C, wherein the control unit (18) is configured to open the supply valve (153) after assuming the initial position.

E. Device (10) in accordance with paragraphs C or D, wherein the control unit (18) comprises executable programme code, wherein the programme code comprises a minimum and/or maximum threshold value for the liquid level, so that the control unit is configured to open the supply valve (153) after verifying that the liquid level exceeds the minimum threshold value and does not exceed the maximum threshold value, respectively.

F. Device (10) in accordance with any of the previous paragraphs, comprising means (19) for determining a temperature of the liquid, connected to the control unit (18).

G. Device (19) in accordance with paragraph F, wherein the means for determining the temperature of the liquid are configured to measure a temperature of an external wall of the vessel (19).

H. Device (10) in accordance with paragraphs F or G, comprising a supply valve (153) for the steam connected to the pipe (15), wherein the supply valve is connected to the control unit (18) in an actuatable way, wherein the control unit comprises executable programme code, wherein the programme code comprises a threshold value for the temperature, so that the control unit is configured for opening the supply valve after verifying that the temperature determined by the means for determining the temperature does not exceed the threshold value for the temperature.

I. Device (10) in accordance with any of the previous paragraphs, wherein the driving device (17) is configured to execute a vertical movement of the end (151) of the pipe and the platform (14) with respect to each other.

J. Device (10) in accordance with any of the previous paragraphs, comprising a housing (11, 12), wherein the platform (14) is arranged in a fixed position with respect to the housing, and the end (151) of the pipe is arranged so as to be movable with respect to the housing, and is configured to be actuated by the driving device (17).

K. Device (10) in accordance with any of the previous paragraphs, wherein the control unit (18) is configured to actuate the driving device (17) to perform a movement path for the relative movement between the end (153) of the pipe and the platform (14) during the supply of steam, starting from the initial position.

L. Device (10) in accordance with paragraph K, wherein the control unit (18) comprises executable programme code for determining the initial position on the basis of the liquid level determined by the means (140) for determining the liquid level.

M. Device (10) in accordance with paragraph L, in which the control unit (10) comprises readable memory in which a first parameter is stored corresponding to a predetermined distance, and wherein the control unit comprises executable programme code to determine the initial position as a position corresponding to the predetermined distance below the liquid level.

N. Device (10) in accordance with paragraphs K to M, wherein the movement path comprises an upward movement during the supply of steam.

O. Device (10) in accordance with paragraph N, wherein the upward movement starts from the initial position.

P. Device (10) in accordance with paragraphs N or O, wherein the control unit (18) comprises readable memory, in which a second parameter is stored corresponding to a predetermined distance to be travelled, and wherein the control unit comprises executable programme code to determine the upward movement as a travelled path corresponding to the second parameter.

Q. Device (10) in accordance with paragraphs N to P, wherein the control unit (18) comprises readable memory, in which a third parameter is stored corresponding to a predetermined speed or a predetermined time span for travelling a distance, and wherein the control unit comprises executable programme code to cause the upward movement to be performed according to the third parameter.

R. Device (10) in accordance with paragraph Q, wherein the third parameter provides a speed of the upward movement which is between 2 mm/s and 15 mm/s.

S. Device (10) in accordance with paragraphs K to R, comprising means (19) for determining a temperature of the liquid, connected to the control unit (18), wherein the control unit is configured for monitoring the temperature during execution of the movement path, wherein the movement path comprises several sub-paths, wherein the transition from one sub-path to a subsequent sub-path is determined by a predetermined threshold value for the temperature.

T. Device (10) in accordance with paragraph S, wherein a sub-path in the control unit (18) is at least determined by a direction of movement for the relative movement, wherein two successive sub-paths comprise a different direction of movement.

U. Device (10) in accordance with paragraphs S or T, wherein a sub-path in the control unit (18) is at least determined by a speed of movement for the relative movement, wherein two successive sub-paths comprise a different speed of movement.

V. Device (10) in accordance with any of the previous paragraphs, comprising a valve system (653) and a liquid discharge (61), wherein the valve system comprises at least two separately closable fluid outlets (6532, 6534) and a fluid inlet (6531), wherein the valve system (653) is configured to assume a first switch position, in which an exclusive connection is made between the fluid inlet (6531) and a first one (6534) of the two fluid outlets, and to assume a second switch position, in which an exclusive connection is made between the fluid inlet (6531) and a second one (6532) of the two fluid outlets, and wherein the first (6534) of the two fluid outlets is connected to the liquid discharge (61) and the second (6532) of the two fluid outlets is connected to the pipe (15).

W. Device in accordance with paragraph V, wherein the fluid inlet (6531) is connected with a connecting port (154) configured for coupling to a steam generator (62).

X. Device in accordance with paragraphs V or W, wherein the valve system (653) comprises a third closable fluid outlet (6533), wherein the third fluid outlet is connected with the pipe (15), and wherein the valve system is configured to assume a third switch position, in which the second (6532) and the third (6533) fluid outlets simultaneously take an open position, while the first fluid outlet (6534) is closed off.

Y. Device in accordance with paragraphs V to X, wherein the valve system (653) is operationally connected to the control unit (18), and the control unit is configured to actuate the valve system to switch between the aforementioned switch positions.

Z. Assembly, comprising a vessel (9) for holding a food liquid, and a device (10) for treating the food liquid by means of steam in accordance with any of the previous paragraphs.

AA. Assembly in accordance with paragraph Z, comprising a holder (20) for the vessel (9), which can be arranged on the platform (14), wherein the holder (20) is provided with first means, and the device is provided with second means, wherein the first and second means are configured to cooperate with one another so that the holder assumes a well-defined orientation with respect to the device.

BB. Assembly in accordance with paragraph AA, wherein the vessel (9) is provided with third means (91), and the holder (20) is provided with fourth means (204), wherein the third and fourth means are configured to cooperate with one another so that the vessel (9) assumes a well-defined orientation with respect to the platform (14).

CC. Assembly in accordance with paragraphs AA or BB, wherein the device (10) comprises means (19) for determining a temperature of the liquid, configured for measuring a temperature of an external wall of the vessel (9), wherein the vessel is made of metal, wherein a part of the external surface has a surface condition which allows the means for determining the temperature to perform a measurement.

DD. Method for treating food liquids by means of steam, wherein the food liquid is in a vessel (9), comprising:

weighing (51) of the vessel (9) containing the food liquid on a platform (14) of a device (10) comprising a steam pipe (15) with an open end (151), configured for supplying steam to the vessel (9);

determining (52) a reference plane corresponding to a liquid level of the food liquid in the vessel (9), wherein the liquid level is determined on the basis of said weighing of the vessel containing the food liquid;

verifying (53) whether the reference plane does not exceed a predetermined threshold value;

actuating a driving device to move (54) the end (151) of the steam pipe (15) to a position on the basis of the reference plane, wherein the position is situated below the liquid level;

opening (55) a steam supply to the steam pipe (15); and performing (56) a relative movement path of the steam pipe (15) with respect to the reference plane, wherein the food liquid is being treated.

EE. Method in accordance with paragraph DD, comprising a continuous measurement of a variable indicative of a temperature of the food liquid in the vessel, and wherein the temperature is used as a parameter for the movement path.

FF. Method in accordance with paragraphs DD or EE, comprising the rinsing of a steam conduit (650) connected to the steam pipe (15) prior to opening the steam supply to the steam pipe, and discharging a rinsing fluid via a discharge line (61) which is different from the steam pipe (15).

GG. Method in accordance with paragraphs DD to FF, wherein the food liquid is milk, and wherein the treatment comprises frothing the milk up.

The invention claimed is:

1. An assembly for treating food liquids by means of steam, comprising a device for treating food liquids using steam, and a vessel configured to hold a liquid, the device comprising:

a platform for placing the vessel, a pipe having an open end and configured to supply steam to the vessel, a driving device configured to drive a relative movement between the open end of the pipe and the platform, a device configured to determine a weight of the liquid in the vessel when the vessel is arranged on the platform, and a control unit operably connected to the device configured to determine the weight of the liquid in the vessel and to the driving device;

wherein the control unit is configured to determine a liquid level of the liquid in the vessel based on the weight of the liquid;

wherein the control unit is configured to actuate the driving device to assume a relative initial position between the open end of the pipe and the platform which is based on the liquid level;

wherein the control unit is configured to actuate the driving device to perform a movement path for the relative movement between the open end of the pipe and the platform during the supply of steam, starting from the relative initial position;

wherein the vessel comprises an RFID chip or RFID tag, and the control unit is operable to read the RFID chip or RFID tag;

wherein the control unit comprises readable memory storing data indicative of sizes of a plurality of vessel types; and wherein the control unit is configured to select one of the plurality of vessel types corresponding to the RFID chip or RFID tag.

2. The assembly according to claim 1, wherein the readable memory comprises data indicative of a list with corresponding values between the weight of the liquid and the liquid level.

3. The assembly according to claim 1, further comprising a supply valve for the steam connected to the pipe, wherein the supply valve is operably connected to the control unit, wherein the control unit is configured to open the supply valve following having actuated the driving device to assume the relative initial position.

4. The assembly according to claim 3, wherein the control unit comprises executable program code, wherein the program code comprises a minimum and/or maximum threshold value for the liquid level, wherein the control unit is configured to open the supply valve after verifying that the liquid level exceeds the minimum threshold value and/or does not exceed the maximum threshold value.

5. The assembly according to claim 1, comprising a sensor for determining a temperature of the liquid, connected to the control unit.

6. The assembly according to claim 5, wherein the sensor for determining the temperature of the liquid is configured to measure a temperature of an external wall of the vessel.

7. The assembly according to claim 6, comprising a supply valve for the steam connected to the pipe, wherein the supply valve is connected to the control unit in an actuatable way, wherein the control unit comprises executable program code, wherein the program code comprises a threshold value for the temperature, wherein the control unit is configured for opening the supply valve after verifying that the temperature determined by the sensor for determining the temperature does not exceed the threshold value for the temperature.

8. The assembly according to claim 1, wherein the driving device is configured to execute a vertical movement of the end of the pipe and the platform with respect to each other.

9. The assembly according to claim 1, comprising a housing, wherein the platform is arranged in a fixed position with respect to the housing, and the end of the pipe is arranged so as to be movable with respect to the housing, and is configured to be actuated by the driving device.

10. The assembly according to claim 1, wherein the control unit comprises executable program code for determining the relative initial position on the basis of the liquid level and wherein the control unit comprises readable memory in which a first parameter is stored corresponding to a predetermined distance, and wherein the control unit comprises executable programme code to determine the relative initial position as a position corresponding to the predetermined distance below the liquid level.

11. The assembly according to claim 1, comprising a sensor for determining a temperature of the liquid, connected to the control unit, wherein the control unit is configured for monitoring the temperature during execution of the movement path, wherein the movement path comprises several sub-paths, wherein a transition from one of the sub-paths to a subsequent one of the sub-paths is determined by a predetermined threshold value for the temperature.

12. The assembly according to claim 11, wherein a sub-path in the control unit is at least determined by a direction of movement for the relative movement, wherein two successive sub-paths comprise a different direction of movement.

13. The assembly according to claim 11, wherein a sub-path in the control unit is at least determined by a speed of movement for the relative movement, wherein two successive sub-paths comprise a different speed of movement.

14. A device for treating food liquids using steam, the device comprising:
   a platform for placing a vessel holding a liquid;
   a pipe having an open end and configured to supply steam to the vessel;
   a driving device configured to drive a relative movement between the open end of the pipe and the platform;
   a device configured to determine a weight of the liquid in the vessel when the vessel is arranged on the platform;
   a control unit operably connected to the device configured to determine the weight of the liquid in the vessel and to the driving device; and
   a valve system and a liquid discharge, wherein the valve system comprises at least two separately closable fluid outlets and a fluid inlet;
   wherein the valve system is configured to assume a first switch position, in which an exclusive connection is made between the fluid inlet and a first one of the two fluid outlets, and to assume a second switch position, in which an exclusive connection is made between the fluid inlet and a second one of the two fluid outlets, and wherein the first of the two fluid outlets is connected to the liquid discharge and the second of the two fluid outlets is connected to the pipe;
   wherein the control unit is configured to determine a liquid level of the liquid in the vessel based on the weight of the liquid in the vessel; and
   wherein the control unit is configured to actuate the driving device to assume a relative initial position between the open end of the pipe and the platform which is based on the liquid level.

15. The device according to claim 14, wherein the fluid inlet is connected with a connecting port configured for coupling to a steam generator.

16. The device according to claim 14, wherein the valve system comprises a third closable fluid outlet, wherein the third fluid outlet is connected with the pipe, and wherein the valve system is configured to assume a third switch position, in which the second and the third fluid outlets simultaneously take an open position, while the first fluid outlet is closed off.

17. The assembly according to claim 1, further comprising a holder for the vessel adapted for being arranged on the platform, wherein the holder and the device are provided with respective first and second cooperating members, allowing for the holder to assume a well-defined orientation with respect to the device.

18. The assembly according to claim 17, wherein the device comprises a sensor for determining a temperature of the liquid, configured for measuring a temperature of an external wall of the vessel, wherein the vessel is made of metal, wherein a part of the external surface has a surface condition which allows the sensor for determining the temperature to perform a measurement.

* * * * *

UNITED STATES PATENT AND TRADEMARK OFFICE
CERTIFICATE OF CORRECTION

| | | |
|---|---|---|
| PATENT NO. | : 10,470,431 B2 | Page 1 of 1 |
| APPLICATION NO. | : 15/527003 | |
| DATED | : November 12, 2019 | |
| INVENTOR(S) | : Jan Adriaens | |

It is certified that error appears in the above-identified patent and that said Letters Patent is hereby corrected as shown below:

On the Title Page

At item (73), the assignee name "Schuilenburg NC" should be changed to --Schuilenburg NV--.

Signed and Sealed this
Eighth Day of September, 2020

Andrei Iancu
*Director of the United States Patent and Trademark Office*